United States Patent [19]

Beekman et al.

[11] Patent Number: 5,444,111
[45] Date of Patent: Aug. 22, 1995

[54] AMMONIUM CHLORIDE AS A PVC CO-STABILIZER

[75] Inventors: George F. Beekman, Middletown; Gary M. Conroy, Cincinnati; Jeffrey R. Hyde, West Chester; Gene K. Norris, Cincinnati, all of Ohio

[73] Assignee: Morton International, Inc., Chicago, Ill.

[21] Appl. No.: 254,460

[22] Filed: Jun. 6, 1994

Related U.S. Application Data

[62] Division of Ser. No. 4,815, Jan. 15, 1993, abandoned.

[51] Int. Cl.⁶ ............................................. C08K 5/58
[52] U.S. Cl. ................................. 524/180; 524/181; 524/236; 524/567
[58] Field of Search .................... 524/236, 567, 180

[56] References Cited

U.S. PATENT DOCUMENTS

| | | | |
|---|---|---|---|
| 1,966,856 | 4/1932 | Groff | 106/22 |
| 2,256,625 | 9/1941 | Quattlebaum . | |
| 2,394,010 | 2/1946 | Quarles | 524/567 |
| 2,394,418 | 2/1946 | Quattlebaum et al. . | |
| 2,832,750 | 4/1958 | Weinberg et al. | 524/181 |
| 2,836,517 | 5/1958 | Gruber et al. | 524/913 |
| 3,069,447 | 12/1962 | Mack | 556/93 |
| 3,239,482 | 3/1966 | Rapp | 524/410 |
| 3,285,959 | 11/1966 | McFarlane | 523/122 |
| 3,441,531 | 4/1969 | Koblitz et al. | 524/236 |
| 3,507,827 | 4/1970 | Pollock | 524/181 |
| 3,759,856 | 9/1973 | Rhodes et al. | 260/23 XA |
| 3,809,669 | 5/1974 | Rainer | 525/378 |
| 3,840,494 | 10/1974 | Murayama et al. | 260/45.8 N |
| 4,058,543 | 11/1977 | Mack | 556/91 |
| 4,127,552 | 11/1978 | Bidston et al. | 524/913 |
| 4,245,073 | 1/1981 | Noel | 526/230 |
| 4,316,837 | 2/1982 | Molt et al. | 260/45.8 N |
| 4,396,552 | 8/1983 | Knobloch et al. | 556/93 |
| 4,745,147 | 5/1988 | Honsberg | 524/388 |
| 4,834,992 | 5/1989 | Larkin | 556/93 |
| 4,957,954 | 9/1990 | Iizuka et al. | 524/102 |
| 5,209,931 | 5/1993 | Levin | 523/122 |

FOREIGN PATENT DOCUMENTS

| | | |
|---|---|---|
| 59-223732 | 12/1984 | Japan . |
| 1-90242 | 4/1989 | Japan . |
| 1068040 | 5/1967 | United Kingdom . |
| 1349913 | 9/1971 | United Kingdom . |

*Primary Examiner*—Veronica P. Hoke
*Attorney, Agent, or Firm*—Robert M. Didrick; Gerald K. White

[57] ABSTRACT

The presence of ammonium halide in a PVC composition along with conventional primary heat stabilizers enhances the heat stability during the early stages of extrusion into pipe and other articles of manufacture. The ammonium halide which is formed as a by-product of the reaction of a metal halide such as zinc chloride or an organotin chloride with a mercaptoester in the presence of ammonia or an amine may be left in the product or a separate source of the ammonium halide may be used to provide the enhanced heat stability.

9 Claims, No Drawings

AMMONIUM CHLORIDE AS A PVC CO-STABILIZER

This is a divisional of application Ser. No. 08/004,815 filed on Jan. 15, 1993 now abandoned.

FIELD OF THE INVENTION

This invention relates to compositions for stabilizing rigid halogen-containing polymers against the deteriorative effects of heat, ultra-violet light and weathering. The stabilizing compositions comprise organotin mercaptides of mercaptoesters in combination with an ammonium halide. The invention also relates to halogen-containing organic polymers stabilized with such compositions and to a process for stabilizing halogen-containing polymers with such compositions.

BACKGROUND OF THE INVENTION

It has been known that halogen-containing organic polymers, especially the commercially important polyvinyl chloride polymers, are subject to deterioration and degradation when exposed to heat, light, and the weather. Various compounds and compositions have been proposed and utilized to stabilize these polymers. For the most part, such compounds have been directed primarily toward stabilization against the effects of heat such as that encountered during processing of the polymer and fabrication thereof into various articles.

A conventional method for making such mercaptides has been the reaction of a mercaptoacid ester with the chloride of the desired metal in the presence of a basic compound which is capable of removing hydrogen chloride as it is split out by the reactants in accordance with the equation:

$(CH_3)_2SnCl_2 + 2\ HSCH_2(C=O)OC_8H_{17} + 2\ NH_4OH\ (CH_3)_2Sn(SCH_2(C=O)OC_8H_{17})_2 + 2\ NH_4Cl + 2\ H_2O$

Ammonia or ammonium hydroxide has often been used because of its low cost. When the resulting mercaptide is a liquid, the ammonium salt may be washed away from it with water and then dried. When the mercaptide product is a solid at the usual working temperatures, however, the salt is more conveniently removed by filtration of the molten product. Disposal of the filter cakes from this sort of process is becoming more costly as regulations become stricter and the availability of landfills diminishes.

It is a widely held belief among those skilled in the art of stabilizing PVC compositions that some nitrogen compounds tend to promote the degradation of the polymer. Although it would have been advantageous from the standpoint of reducing wastes to allow the ammonium chloride to remain in the metal mercaptide or even to return some portion of the filter cake containing it to the filtered product, it has not been done until this invention because it was thought that the ammonium chloride would hurt the stability of PVC.

SUMMARY OF THE INVENTION

It is an object of this invention to provide a heat stabilizing composition for halogen-containing polymers which comprises ammonium chloride, an amine hydrohalide, or a quaternary ammonium halide.

It is another object of this invention to provide a method for the disposal of ammonium chloride formed as a by-product of the preparation of metal mercaptide heat stabilizers.

It is a related object of this invention to provide a heat stabilized halogen-containing polymer composition wherein an ammonium halide enhances the heat stability of the composition.

These and other objects which will become apparent from the following description of the invention are achieved by incorporating in the composition a salt having the formula:

$$R_4N^+X^-$$

wherein R is hydrogen, alkyl, aryl, or hydroxyalkyl; and X is a chloride or bromide ion. The alkyl group has from 1 to 20 carbon atoms in a straight or branched chain. The aryl group includes haloaryl, alkaryl and aralkyl radicals as well as unsubstituted aromatic hydrocarbyl radicals. For the purposes of this invention, the salt described by the above formula will be called an ammonium halide.

The ammonium halide is used in conjunction with primary heat stabilizers as exemplified partially by the organotin mercaptides of mercaptoesters already mentioned. The dimethyltin product of the equation given above and homologs thereof are sold under the trademark Advastab by Morton Internatinal, Inc. Those and other organotin mercaptides of mercaptoacid esters are described in U.S. Pat. No. 3,810,868, which is incorporated herein by reference. Other primary heat stabilizers include the mercaptoesters described by Formulas III and IV in U.S. Pat. No. 4,360,619, which also is incorporated herein by reference. Thus, the heat stabilizing compositions of this invention comprise metal mercaptides and the ammonium halides.

DETAILED DESCRIPTION OF THE INVENTION

The ammonium halide may be added as a chemical entity to the halogen-containing polymer composition or it may, as illustrated above, be made in situ and allowed to remain with the metal mercaptide as the latter is mixed into the composition. Mixtures of the ammonium halides may be utilized in this invention. The effective amount of the ammonium halide is about 0.2 percent by weight or less of the stabilized halogen-containing polymer composition, preferably from about 0.01 percent or less to about 0.05 percent. It may be incorporated in the composition as a solid or as an aqueous solution. In addition to the ammonium chloride, the salt is exemplified by ammonium bromide, quaternary ammonium halides such as tetramethylammonium chloride and tetraethylammonium bromide, and amine hydrohalides such methylamine hydrochloride, dimethylamine hydrochloride, dibutylamine hydrobromide, diethanolamine hydrochloride, toluidine hydrochloride, benzylamine hydrochloride, naphthylamine hydrochloride, and diphenylamine hydrochloride.

Any suitable primary heat stabilizer for halogen-containing organic polymers may be employed in the stabilizer compositions of this invention. Further examples of organotin mercaptides useful in the practice of this invention include but are not limited to the alkyltin mercaptoalkylalkanoates such as dimethyltin bis(mercapto-ethyloleate). Methods for preparing these and other organotin mercaptoesters are described in U.S. Pat. Nos. 3,565,930; 3,869,487; 3,979,359; 4,118,371;

4,134,878; and 4,183,846, each of which is incorporated herein by reference.

The amount of the primary heat stabilizer (metal mercaptide) employed in the halogen-containing organic polymer compositions of this invention can vary considerably, depending upon the particular stabilizing components employed and their relative amounts, the particular polymer to be stabilized, the severity of the heat, light, and weathering to which the polymer will be subjected and the degree of stabilization desired. In general, from about 0.4 to about 2.0 phr of the primary stabilizer, based on the weight of the halogen-containing organic polymer, will be sufficient to impart the desired properties to the composition in most cases. Amounts greater than this may be employed but at some level the increase in stabilization is not commensurate with the additional amount.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymer usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chlorothelene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylonitrilebutadiene-styrene copolymer, and polyvinyl chloride and polyetheylene and polymethy methacrylate. Typical vinyl halide copolymers usable in this invention include vinyl chloride-vinyl acetate (87:13), vinyl chloride-vinylidene chloride (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer.

In addition to the halogen-containing polymer and the stabilizer composition, the polymer composition of this invention may contain conventional additives such as fillers, pigments, plasticizers, dyes, antioxidants, and ultraviolet light stabilizers. It may also contain lubricants exemplified by calcium salts of fatty acids, paraffin waxes, stearyl stearate, cetyl palmitate, and other ester waxes. Materials such as calcined clays, calcium carbonate, and talcs may be used as fillers. Suitable pigments include titanium dioxide, carbon black, and iron oxide. Phthalates, sebacates, adipates, phosphates, and fatty esters having between 16 and 150 carbon atoms are representative of well known plasticizers suitable for the compositions of this invention. Suitable antioxidants include tricresyl phosphite; 2,6-di-t-butyl-4-methyl phenol; 2,6-di-t-butyl-4-decoxy phenol; and 2-t-butyl-4octadecyloxy phenol.

Likewise, the amount of the stabilizer composition employed in the polymer compositions of this invention may vary over a wide range. An effective amount is, of course, all that is needed. In general, that effective amount may be as little as 1.5 parts by weight, or less, of the stabilizer composition per hundred parts by weight of the halogen-containing polymer. While there is no critical upper limit on the amount of stabilizer composition, amounts in excess of 5 parts by weight per hundred parts by weight of the halogen-containing polymer do not yield a commensurate increase in effectiveness. Preferably, the stabilizer compositions of this invention are employed in amounts ranging from about 0.1 part to about 2.5 parts by weight per hundred parts by weight of the halogen-containing polymer.

The halogen-containing organic polymer composition of this invention may be prepared by methods well known in the art and by the use of conventional equipment. The stabilizer composition may be added to the halogen-containing polymer with continuous blending in a high intensity mixer such as a Henschel blender. The important consideration is that the stabilizer composition and the halogen-containing polymer be thoroughly blended.

The stabilized halogen-containing polymer compositions of this invention may be used to form articles of manufacture such as pipe. A variety of conventional extrusion and molding techniques may be employed to form the stabilized compositions into any desired shape.

The following examples illustrate the invention. Unless otherwise indicated, all amounts, parts, and percentages are by weight.

| Component | Control | A | B | C |
|---|---|---|---|---|
| Oxy 190 PVC (Occidental) | 100 | 100 | 100 | 100 |
| Processing aid (Acryloid K-120N, Rohm & Haas) | 1.5 | 1.5 | 1.5 | 1.5 |
| Impact modifier (Kane Ace B-22) | 6 | 6 | 6 | 6 |
| Oxidized polyethylene (Allied) | 0.2 | 0.2 | 0.2 | 0.2 |
| Ester wax lubricant | 1.7 | 1.7 | 1.7 | 1.7 |
| Epoxidized soy bean oil | 1.0 | 1.0 | 1.0 | 1.0 |
| Dimethyltin bis-(iso-octyl thioglycolate) Advastab Tm-181 | 1.0 | 1.0 | 1.0 | 1.0 |
| NH$_4$Cl (solid) | — | 0.025 | 0.05 | 0.1 |

Compositions A, B, and C and the Control were subjected to a Brabender stability test at 160° C. (320° F.) at 70 rpm and the color of samples taken at two minute intervals was determined with a colorimeter. The Whiteness Index (WI) and the dE for each composition after two, four and six minutes are given in the Table I.

TABLE I

| | Whiteness Index | | | dE | | |
|---|---|---|---|---|---|---|
| | Time (minutes) | | | | | |
| Compsn. | 2 | 4 | 6 | 2 | 4 | 6 |
| A | 28.1 | 11.4 | 1.3 | 16.7 | 18.6 | 20.3 |
| B | 29.5 | 11.4 | 2.1 | 16.0 | 18.8 | 20.1 |
| C | 27.9 | 10.5 | 2.0 | 16.7 | 18.8 | 20.1 |
| Control | 25.4 | 8.4 | 0.1 | 17.0 | 19.2 | 20.7 |

| Component | Control | A | B | C |
|---|---|---|---|---|
| Oxy 190 PVC (Occidental) | 100 | 100 | 100 | 100 |
| Processing aid (Acryloid K-120N, Rohm & Haas) | 1.5 | 1.5 | 1.5 | 1.5 |
| Impact modifier (Kane Ace B-22) | 6 | 6 | 6 | 6 |
| Oxidized polyethylene (Allied) | 0.2 | 0.2 | 0.2 | 0.2 |
| Ester wax lubricant | 1.7 | 1.7 | 1.95 | 1.7 |
| Epoxidized soy bean oil | 1.0 | 1.0 | 1.0 | 1.0 |
| Mixture of mono- and dimethyltin mercapto-ethyloleates (Advastab TM-593) | 1.0 | 1.0 | 1.0 | 1.0 |
| NH$_4$Cl (solid) | — | 0.025 | 0.05 | 0.1 |

The Control and Examples 2A, 2B, and 2C were separately placed on a mill having a front roll operating at 30 rpm and a rear roll operating at 40 rpm, heated to 370° F. (188° C.) and were milled with sampling at two minute intervals. Colorimetry tests of the samples gave the results shown in Table II.

TABLE II

| | Whiteness Index | | | dE | | |
|---|---|---|---|---|---|---|
| | Time (minutes) | | | | | |
| Ex. | 2 | 4 | 6 | 2 | 4 | 6 |
| 2A | 31.0 | 23.4 | 10.2 | 16.9 | 17.6 | 19.7 |
| 2B | 31.5 | 22.3 | 9.5 | 16.7 | 17.9 | 20.4 |
| 2C | 28.4 | 17.8 | 0.6 | 17.4 | 18.7 | 21.6 |
| Control | 30.6 | 22.7 | 9.3 | 17.0 | 17.7 | 20.0 |

| Component | Control | A | B | C | D | E | F |
|---|---|---|---|---|---|---|---|
| PVC, pipe grade (Shintech SE 950) | 100 | 100 | 100 | 100 | 100 | 100 | 100 |
| CaCO$_3$ (Omya Carb FT) | 5.0 | 5.0 | 5.0 | 5.0 | 5.0 | 5.0 | 5.0 |
| TiO$_2$ | 1.0 | 1.0 | 1.0 | 1.0 | 1.0 | 1.0 | 1.0 |
| Lubricant/stabilizer* (Advapak LS-203, Morton) | 2.0 | 2.0 | 2.0 | 2.0 | 2.0 | 2.0 | 2.0 |
| NH$_4$Cl (solid) | — | 0.01 | 0.05 | 0.1 | 0.2 | — | — |
| NH$_4$Cl (25% aqueous solution | — | — | — | — | — | 0.04 | 0.40 |

*stabilizer is Advapak TM-599 organotin mercaptoethyloleate

The results of dynamic mill tests of the compositions of these examples and the Control run at 390° F. but otherwise as described in Example 2 are shown in Table III.

TABLE III

| | Whiteness Index | | | | dE | | | |
|---|---|---|---|---|---|---|---|---|
| | Time (minutes) | | | | | | | |
| Ex. | 1 | 2 | 3 | 4 | 1 | 2 | 3 | 4 |
| 3A | 51.4 | 31.6 | 26.1 | 15.2 | 6.3 | 10.0 | 11.0 | 13.1 |
| 3B | 47.5 | 36.8 | 28.7 | 17.9 | 7.0 | 9.0 | 10.5 | 12.6 |
| 3C | 52.8 | 41.5 | 31.3 | 20.8 | 6.0 | 8.1 | 10.0 | 12.0 |
| 3D | 57.4 | 46.6 | 37.0 | 26.1 | 5.1 | 7.1 | 8.9 | 11.0 |
| 3E | 54.2 | 47.1 | 39.1 | 25.8 | 5.8 | 7.1 | 8.5 | 11.1 |
| 3F | 53.9 | 48.7 | 34.3 | 11.8 | 5.8 | 6.8 | 9.7 | 14.5 |
| Cont. | 47.1 | 31.4 | 21.5 | 16.8 | 7.1 | 10.0 | 11.9 | 12.8 |

| Component | Control | A | B | C | D | E |
|---|---|---|---|---|---|---|
| PVC, pipe grade (Shintech SE 950) | 100 | 100 | 100 | 100 | 100 | 100 |
| CaCO$_3$ (Omya Carb FT) | 5.0 | 5.0 | 5.0 | 5.0 | 5.0 | 5.0 |
| TiO$_2$ | 1.0 | 1.0 | 1.0 | 1.0 | 1.0 | 1.0 |
| Lubricant/stabilizer* (Advapak LS-203, Morton) | 2.0 | 2.0 | 2.0 | 2.0 | 2.0 | 2.0 |
| NH$_4$Cl (in TM-599 filter cake containing 30.5% NH$_4$Cl, 9.9% Sn) | — | 0.03 | — | — | — | — |
| TM-599 (to equal that in filter cake above | — | — | 0.06 | — | — | — |
| NH$_4$Cl (in TM-599 filter cake containing 22.8% NH$_4$Cl, 7.7% Sn) | — | — | — | 0.02 | — | — |
| TM-599 (to equal that in filter cake above) | — | — | — | — | 0.05 | — |
| NH$_4$Cl (in filter cake containing 13.3% NH$_4$Cl, 9.0% Sn; equivalent to 0.055% TM-599) | — | — | — | — | — | 0.01 |

Thus, Example 4B contained more of the primary heat stabilizer than did Composition 4E, yet as shown in Table IV, 4E gives better early color than does 4B during a dynamic mill test at 390° F.

TABLE IV

| | Whiteness Index | | | | dE | | | |
|---|---|---|---|---|---|---|---|---|
| | Time (minutes) | | | | | | | |
| mp. | 1 | 2 | 3 | 4 | 1 | 2 | 3 | 4 |
| 4A | 57.6 | 51.9 | 49.8 | 44.9 | 5.1 | 6.2 | 6.6 | 7.5 |
| 4B | 52.4 | 48.5 | 41.9 | 35.4 | 6.2 | 6.8 | 8.1 | 9.3 |
| 4C | 54.3 | 45.5 | 42.0 | 34.6 | 5.9 | 7.5 | 8.2 | 9.6 |
| 4D | 53.3 | 43.5 | 38.2 | 32.7 | 5.9 | 7.7 | 8.7 | 9.8 |
| 4E | 56.8 | 51.1 | 49.6 | 42.0 | 5.4 | 6.6 | 8.1 | 9.6 |
| Cont. | 47.2 | 35.0 | 26.1 | 16.1 | 7.1 | 9.3 | 11.1 | 13.0 |

The subject matter claimed is:

1. A composition comprising a halogen-containing polymer, a metal mercaptide of a mercaptoester as the primary heat stabilizer and from about 0.01 to about 0.2 percent by weight of, based on the total weight of the composition, of an ammonium halide having the formula:

$$R_4N^+X^-$$

wherein R is hydrogen, alkyl, aryl, alkaryl, aralkyl, or hydroxyalkyl; and X is a chloride or bromide ion.

2. The composition of claim 1 wherein the metal mercaptide is an organotin mercaptide of a mercaptoester.

3. The composition of claim 1 wherein the halide is a by-product of a double decomposition reaction whereby the mercaptide is made from the mercaptoester and a corresponding halide of the metal in the presence of a base which generates the $R_4N^+$ ion.

4. The composition of claim 3 wherein the halide comprises a portion of a filter cake from a filtration of a reaction mixture generated by such a reaction.

5. The composition of claim 1 wherein the amount of ammonium halide is from about 0.01 to about 0.05 percent.

6. A method for stabilizing a halogen-containing polymer comprising adding a metal mercaptide of a mercaptoester as the primary heat stabilizer and from about 0.01 to about 0.2 by weight, based on the total weight of the stabilized polymer, of an ammonium halide having the formula:

$$R_4N^+X^-$$

wherein R is hydrogen, alkyl, aryl, alkaryl, aralkyl, or hydroxyalkyl; and X is a chloride or bromide ion.

7. The method of claim 6 wherein the amount of ammonium halide is from about 0.01 to about 0.05 percent.

8. The method of claim 6 wherein the ammonium halide is added as an aqueous solution.

9. The method of claim 8 further characterized by drying the polymer.

* * * * *

UNITED STATES PATENT AND TRADEMARK OFFICE
CERTIFICATE OF CORRECTION

PATENT NO. : 5,444,111
DATED : August 22, 1995
INVENTOR(S) : Beekman et al.

It is certified that error appears in the above-indentified patent and that said Letters Patent is hereby corrected as shown below:

Col. 1, Ln. 37, change "$NH_4OH \ (CH_3)_2Sn(SCH_2(C=O)OC_8H_{17})_2$" to read -- $NH_4OH \rightarrow (CH_3)_2Sn(SCH_2(C=O)OC_8H_{17})_2$ --.

Col. 4, Ln. 48, insert -- EXAMPLE 1 --.

Col. 5, Ln. 11, insert -- EXAMPLE 2 --.

Col. 5, Ln. 57, insert -- EXAMPLE 3 --.

Col. 6, Ln. 17, insert -- EXAMPLE 4 --.

Signed and Sealed this

Eleventh Day of June, 1996

Attest:

BRUCE LEHMAN

*Attesting Officer*  *Commissioner of Patents and Trademarks*